(12) United States Patent
Galden

(10) Patent No.: US 9,239,107 B2
(45) Date of Patent: Jan. 19, 2016

(54) NEUTRAL LOCKING SYSTEM AND TOOL FOR VEHICLE

(71) Applicant: Honda Motor Co., Ltd., Tokyo (JP)

(72) Inventor: Daric J. Galden, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 335 days.

(21) Appl. No.: 13/728,887

(22) Filed: Dec. 27, 2012

(65) Prior Publication Data

US 2014/0182408 A1  Jul. 3, 2014

(51) Int. Cl.
*F16H 61/22* (2006.01)
*F16H 63/34* (2006.01)

(52) U.S. Cl.
CPC ............ *F16H 61/22* (2013.01); *F16H 63/3491* (2013.01); *F16H 2061/226* (2013.01); *Y10T 74/20085* (2015.01)

(58) Field of Classification Search
CPC ............ F16H 63/3416; F16H 63/6425; F16H 63/3491; F16H 63/48; F16H 63/486
USPC ............ 74/473.36, 473.37; 192/219.5, 219.6; 81/177.2, 177.1, 120, 121.1, 124.6, 81/124.7, 13, 155, 488
See application file for complete search history.

(56) References Cited

U.S. PATENT DOCUMENTS

| | | | |
|---|---|---|---|
| 980,632 A * | 1/1911 | Hartvigsen | 81/177.5 |
| 1,458,136 A * | 6/1923 | Kloepper | 192/219.5 |
| 1,643,814 A | 9/1927 | Peterson | |
| 3,928,877 A | 12/1975 | Tregoning | |
| 4,280,595 A * | 7/1981 | Timms et al. | 188/31 |
| 4,282,769 A | 8/1981 | Sandrock | |
| 4,485,702 A * | 12/1984 | Swan et al. | 81/98 |
| 4,645,046 A * | 2/1987 | Takano et al. | 192/219.5 |
| 5,113,977 A * | 5/1992 | Ridings et al. | 188/69 |
| 5,357,643 A * | 10/1994 | Seals | 7/138 |
| 5,528,964 A | 6/1996 | Smith, Jr. | |
| 5,531,303 A * | 7/1996 | Raszkowski | 192/219.5 |
| 5,797,300 A * | 8/1998 | Fairbanks | 81/60 |
| 6,089,128 A | 7/2000 | Kopyless | |
| D433,293 S | 11/2000 | Marcus | |
| 6,286,396 B1 * | 9/2001 | Johnson | 81/60 |
| 7,228,766 B1 * | 6/2007 | Shyu | 81/177.1 |
| 7,364,027 B2 * | 4/2008 | Matsubara et al. | 192/219.5 |
| 2004/0089113 A1 | 5/2004 | Morgan | |
| 2009/0050435 A1 * | 2/2009 | Yamada et al. | 192/219.5 |
| 2012/0145512 A1 * | 6/2012 | Kim et al. | 192/219.5 |

FOREIGN PATENT DOCUMENTS

GB    1477355    6/1977

* cited by examiner

*Primary Examiner* — William Kelleher
*Assistant Examiner* — Emily Cheng
(74) *Attorney, Agent, or Firm* — Rankin, Hill & Clark LLP

(57) ABSTRACT

A neutral locking system for a vehicle includes a park release shaft and a neutral locking tool. The park release shaft is operatively connected to the transmission such that rotation of the park release shaft places the transmission in a neutral state. The tool is configured to couple to the park release shaft such that rotation of the tool rotates the park release shaft. The tool can also include a sliding locking pin having a first position allowing rotation of the tool within an engine compartment and a second position in which the pin contacts a component in the engine compartment to limit rotation of the tool.

14 Claims, 10 Drawing Sheets

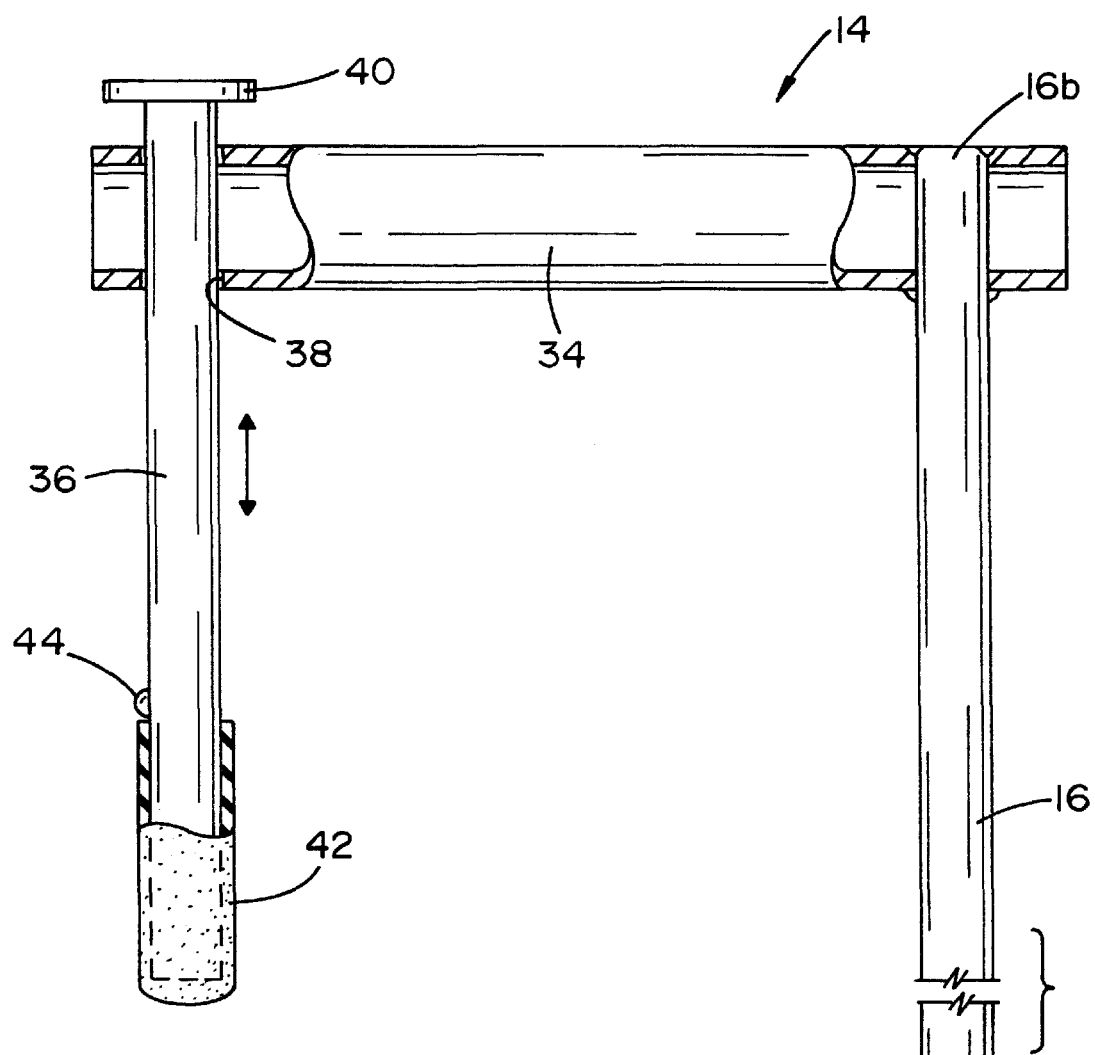
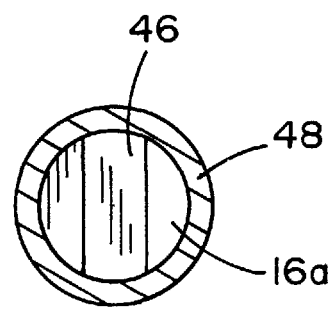
FIG. 2
FIG. 3
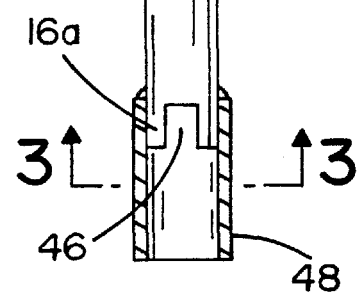

NEUTRAL LOCKING SYSTEM AND TOOL FOR VEHICLE

BACKGROUND

Vehicle transmissions sometimes must be put into a neutral state in order for various service operations to be performed on the vehicle. In a manual transmission, this can be as simple as moving the manual shift lever to the neutral position. In one known manual transmission, a locking mechanism is provided for engaging the manual shift lever and holding or locking the shift lever in the neutral position so as to prevent the shift lever from inadvertently moving out of the neutral position. In automatic transmissions, a particular method and/or arrangement may be needed for the particular transmission that is to be placed into the neutral state.

SUMMARY

According to one aspect, a neutral locking system for a vehicle includes a park release shaft and a neutral locking tool. The park release shaft is operatively connected to a transmission such that rotation of the park release shaft in a first rotatable direction places the transmission in a neutral state. The park release shaft is located adjacent an aperture of a transmission case that houses the transmission. The neutral locking tool has a main shaft with one end configured to nonrotatably and removably couple to the park release shaft such that rotation of the main shaft rotates the park release shaft.

According to one embodiment, the neutral locking tool can include a locking pin having a first position allowing rotation of the tool within an engine compartment and a second position in which the pin contacts a component in the engine compartment to limit rotation of the tool.

According to another aspect, a neutral locking tool for a vehicle includes a main shaft having a lower end configured to nonrotatably and removably couple to an associated park release system of a vehicle for placing a transmission of the vehicle in a neutral position when rotated and a handle portion extending from the main shaft at a location spaced apart from the lower end of the main shaft for facilitating rotation of the main shaft. The neutral locking tool further includes a locking pin slidably mounted to the handle portion at a location spaced apart from the main shaft for movement between a raised position and a lowered position. The locking pin in the raised position allowing rotation of the handle portion and thereby the main shaft. The locking pin in the lowered position preventing rotation of the handle portion and thereby preventing rotation of the main shaft.

According to a further aspect, a vehicle neutral locking system includes a park release shaft and a neutral locking tool. The park release shaft is operatively coupled to a transmission such that rotation of the park release shaft places the transmission in a neutral state. The neutral locking tool has a main shaft with one end configured to nonrotatably and removably couple to the park release shaft such that rotation of the neutral locking tool rotates the park release shaft.

BRIEF DESCRIPTION OF THE DRAWINGS

FIG. 2 is a side elevation view, partially in cross-section, of the neutral locking tool of FIG. 1.

FIG. 3 is a cross-sectional view of the neutral locking tool taken at line 3-3 of FIG. 2.

DETAILED DESCRIPTION

Figure 1:
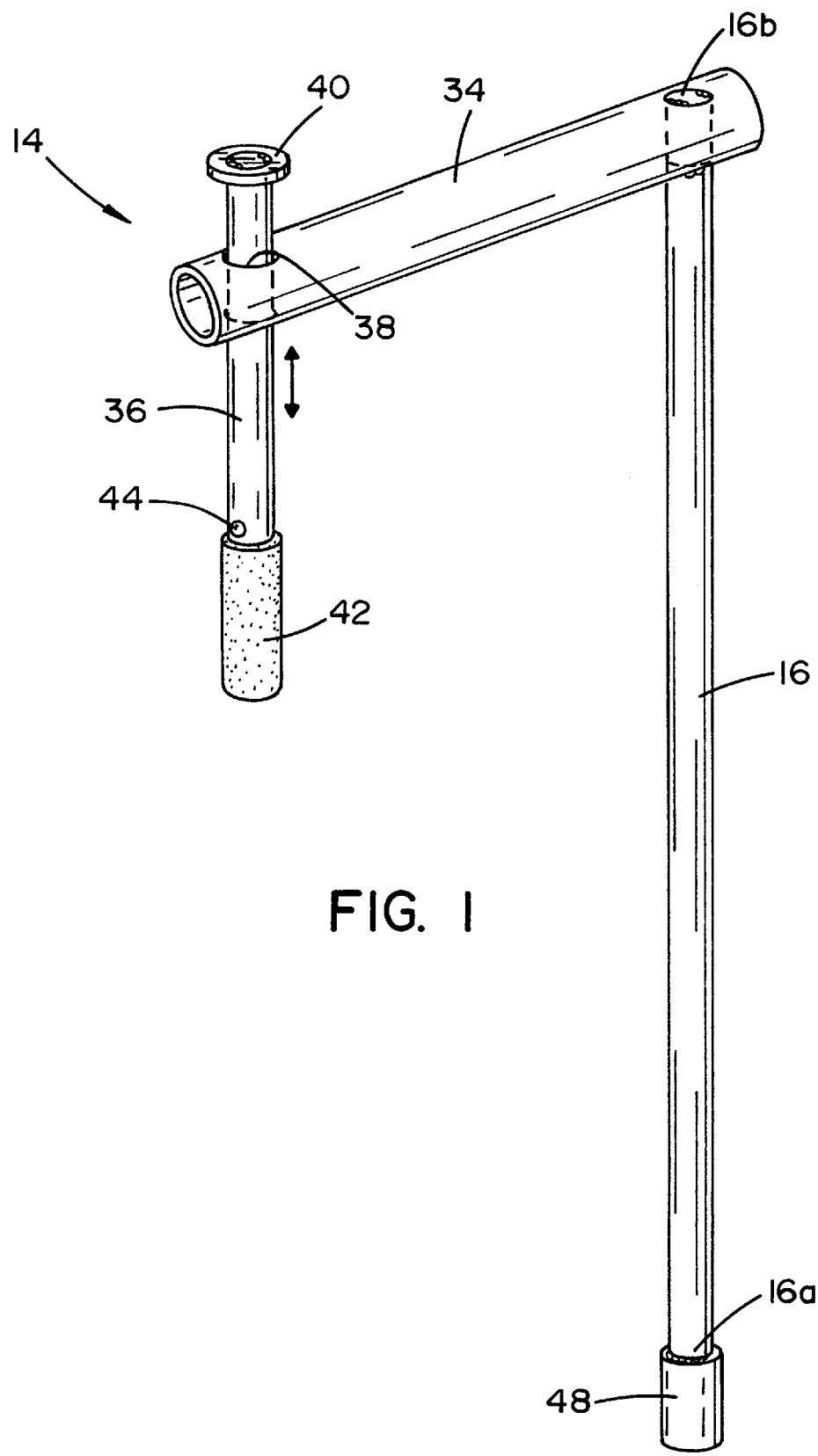
FIG. 1 is a perspective view of a neutral locking tool according to one exemplary embodiment.

Referring now to the drawings wherein the showings are for purposes of illustrating one or more exemplary embodiments and not for purposes of limiting same, FIGS. 1-4 illustrate a neutral locking system 10 for a vehicle 12, which is also referred to herein as a vehicle neutral locking system, that includes a neutral locking tool 14 having a main shaft 16 with a lower end 16a configured to nonrotatably and removably couple to a park release shaft 18 of the vehicle 12 such that rotation of the neutral locking tool 14, and particularly the main shaft 16, rotates the park release shaft 18. As will be described in more detail below, the park release shaft 18 is operatively coupled to a transmission 20 of the vehicle 12 such that rotation of the park release shaft places the transmission 20 in a neutral state. The transmission 20 in such a neutral state can allow for various service operations to be performed on the vehicle 12.

More particularly, in the illustrated embodiment, a transmission case 22 houses the transmission 20 of the vehicle 12. As shown, the transmission case 22 can have an aperture 24 defined therein with the park release shaft 18 located adjacent the aperture 24 such that the park release shaft 18 is accessible. The park release shaft 18 is operatively connected to the transmission 20 such that rotation of the park release shaft 18 in a first rotatable direction (i.e., counterclockwise in FIG. 4) places the transmission 20 into the neutral state. In the illustrated embodiment, a protuberance 26 in the shape of a block member is positioned on the transmission case 22, or a top wall thereof, and the aperture 24 is defined in the protuberance 26 through which the park release shaft 18 passes.

Figure 8:
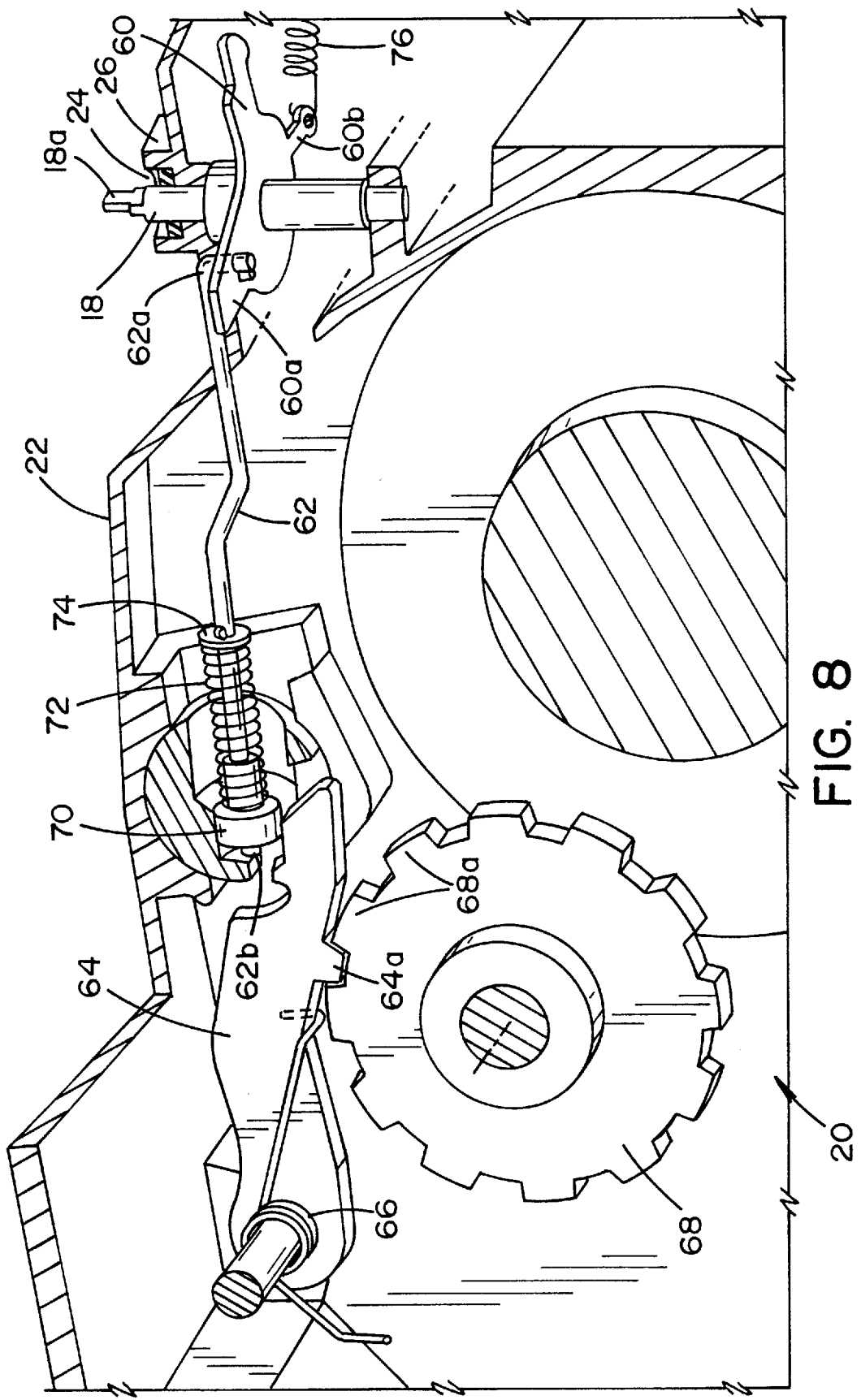
FIG. 8 is a perspective view, partially in cross-section, of a park release structure associated with the transmission showing the transmission in an engaged state (not a neutral state).
Figure 9:
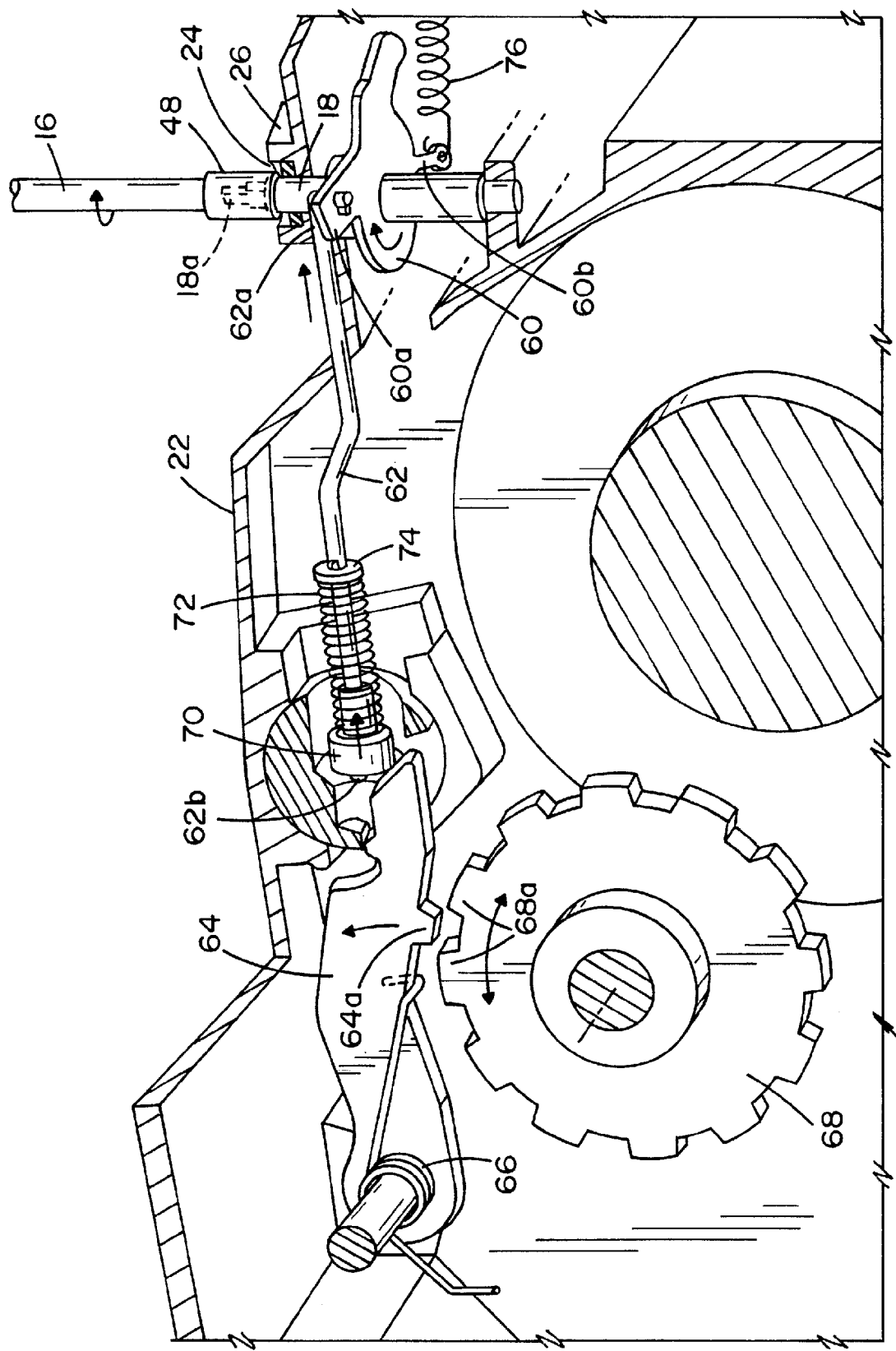
FIG. 9 is a perspective view similar to FIG. 9 but showing the transmission in the neutral state.

With additional reference to FIGS. 8 and 9, the park release shaft 18 is shown inside the transmission case 22. In the illustrated embodiment, a plate member 60 is fixedly secured to the park release shaft 18 inside the transmission case 22 such that rotation of the park release shaft 18 causes rotation of the plate member 60. As shown, the plate member 60 can be specifically arranged such that a vertical axis of the park release shaft 18 defined by a longitudinal or axial extent of the park release shaft 18 is orthogonally oriented relative to a plane in which the plate member 60 resides. The plate member 60 has an arm portion 60a to which a proximal end 62a of a park release rod 62 is connected. A distal end 62b of the park release rod 62 normally urges and/or maintains a parking pawl 64 in an engaged position (FIG. 8) against the biasing of a parking pawl spring 66 wherein a tooth 64a of the parking pawl 64 meshes with the gear teeth 68a of a parking gear 68 of the transmission 20. This position can correspond to the transmission 20 being in a park state (and/or can correspond to an engine of the vehicle 12 being off) and functions to limit vehicle movement.

In the illustrated embodiment, the distal end 62b includes an engaging member 70 slidably disposed on the park release rod 62 for engaging the parking pawl 64 which, in turn, causes the tooth 64a to engage and/or mesh with the parking gear teeth 68a. The engaging member 70 is urged away from the proximal end 62a by a coil spring 72 arranged between the engaging member 70 and a washer member 74 arranged on the park release rod 62 between the proximal and distal ends 62a, 62b. The sliding arrangement of the engaging member 70 on the park release rod 62 allows for smoother cooperation between the park release rod 62 and the parking pawl 64, particularly when the tooth 64a of the parking pawl 64 is not precisely aligned between two adjacent ones of the gear teeth 68a of the parking gear 68. A spring 76 can be connected to an arm portion 60b of the plate member 60 for biasing the plate member 60 and thereby the park release shaft 18 in a second rotatable direction (a rotatable direction opposite the first rotatable direction).

When the park release shaft 18 is rotated in the first rotatable direction, as illustrated in FIG. 9, the plate member 60 likewise rotates and causes the park release rod to move away from the parking pawl 64. This in turn causes the engaging member 70 to pull away from the parking pawl 64 thereby allowing the parking pawl spring 66 to rotate the parking pawl 64 out of meshing engagement with the parking gear 68. This disengages the parking gear 68. Accordingly, the parking gear 68 is then free to rotate and the transmission is placed in a neutral state.

Figure 4:
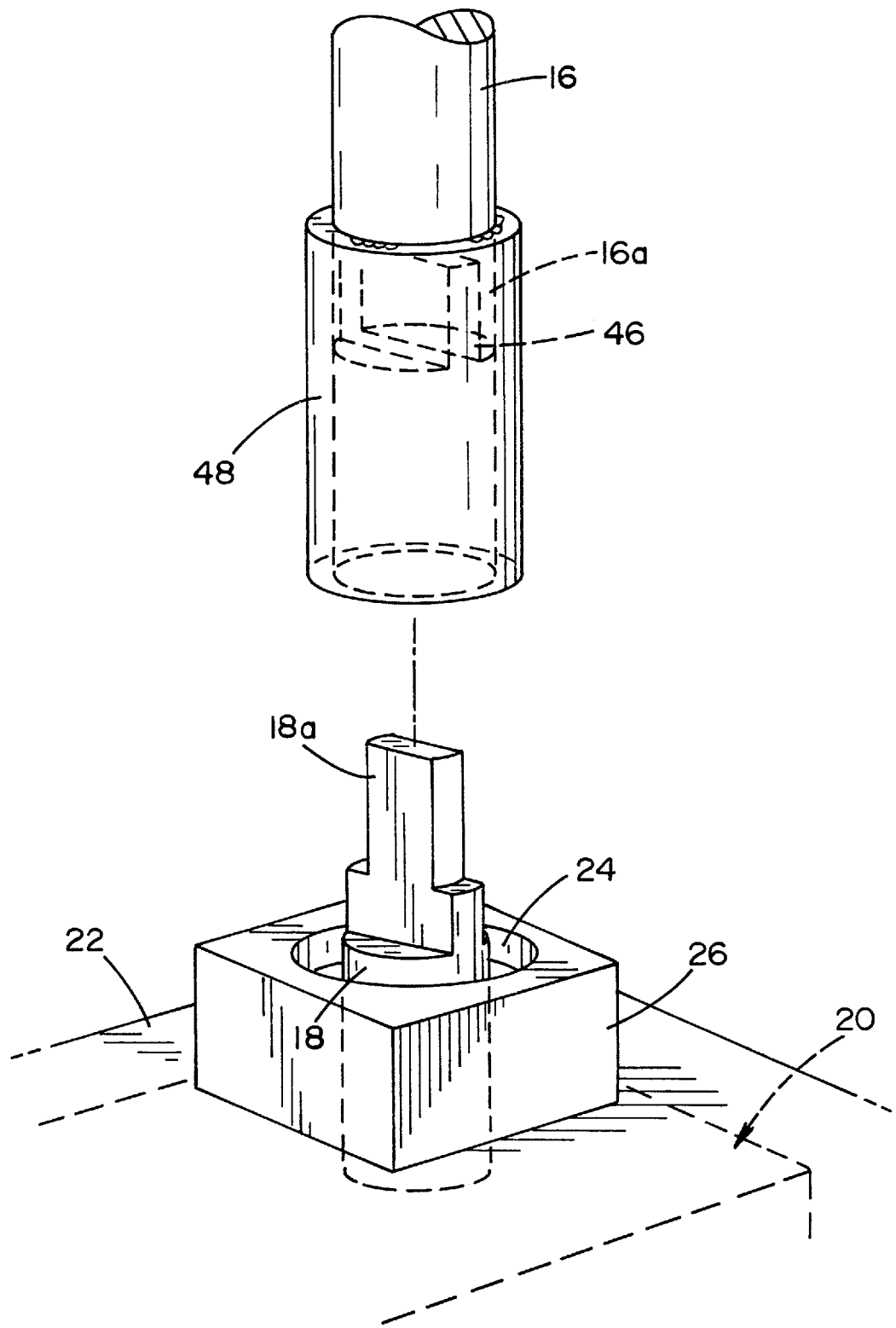
FIG. 4 is a partial perspective view of a neutral locking system including the neutral locking tool of FIGS. 1-3 and a transmission case housing a transmission.
Figure 5:
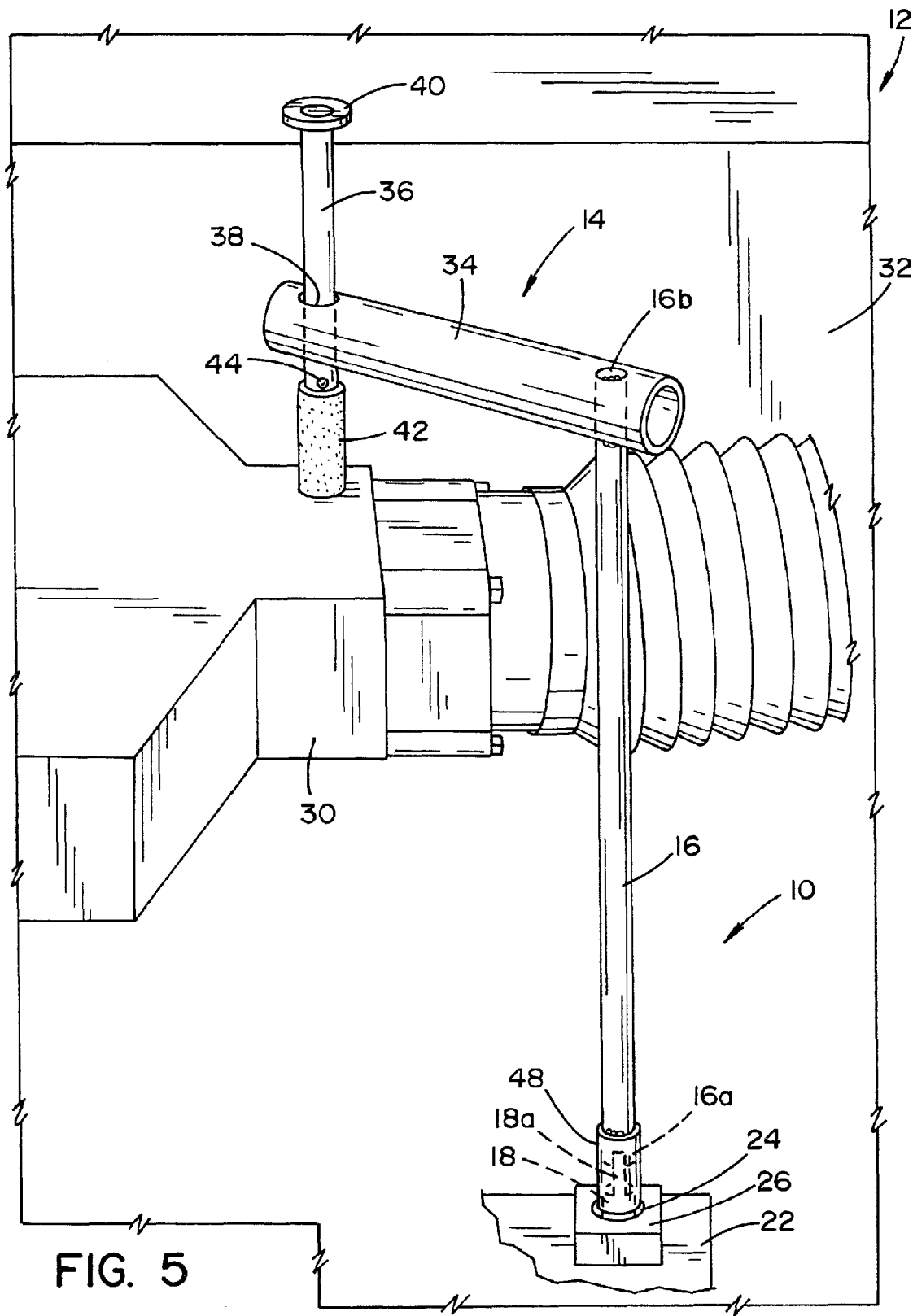
FIG. 5 is a partial perspective view of the neutral locking system wherein the neutral locking tool is rotated past a component disposed in an engine compartment of the vehicle.
Figure 6:
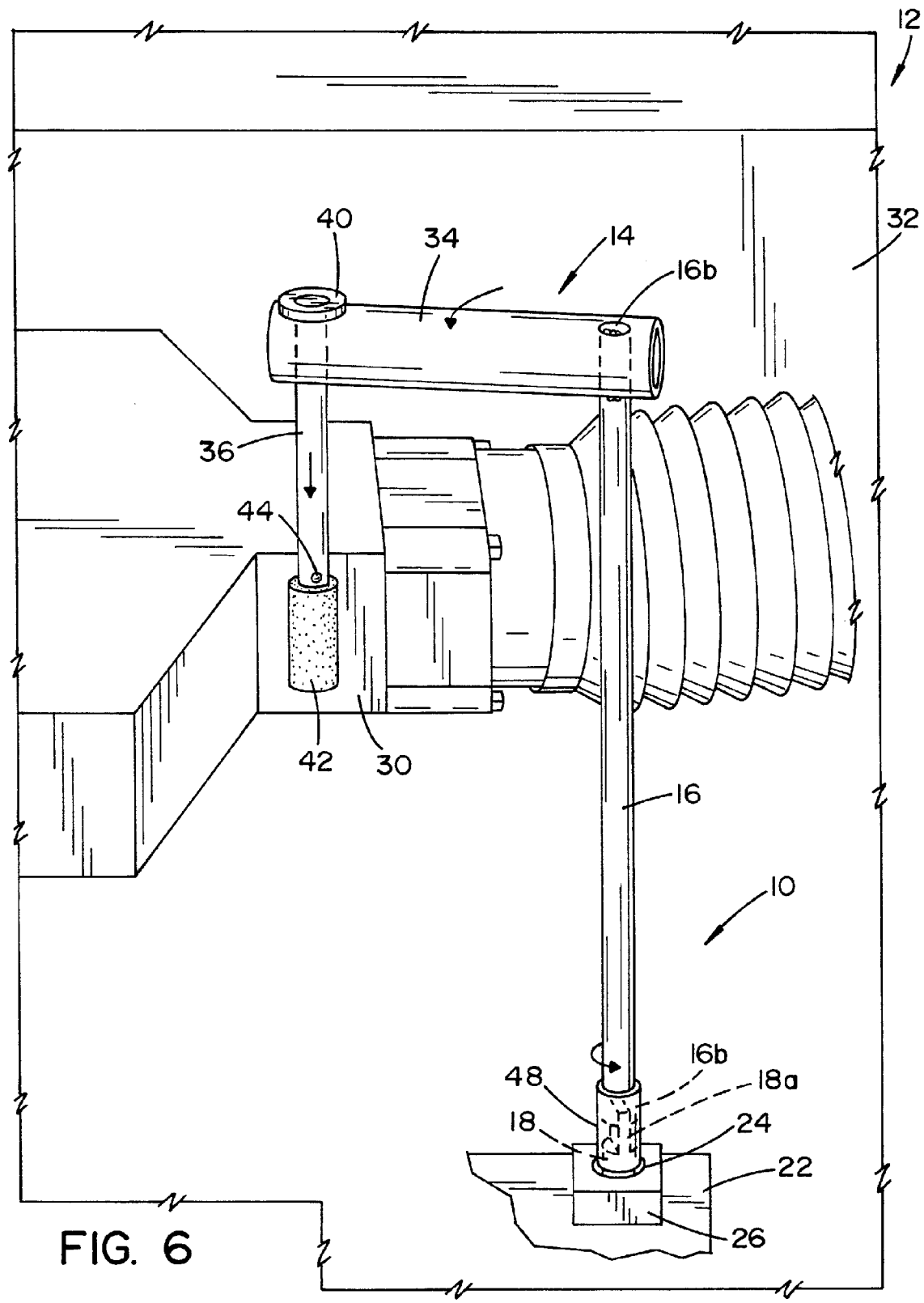
FIG. 6 is another partial perspective view, similar to FIG. 5, but showing a handle portion of the neutral locking tool having a locking pin contacting the component disposed in the engine compartment to limit rotation of the neutral locking tool.

As illustrated, the main shaft 16 of the neutral locking tool 14 can be elongated to facilitate the lower end 16a reaching the park release shaft 18, particularly in environments where the park release shaft projects a minimal amount from the transmission case 22 (e.g., as shown in FIG. 4) and/or where the park release shaft 18 is disposed deep or low into an engine compartment of the vehicle causing the park release shaft 18 to be relatively inaccessible (e.g., as shown in FIGS. 5 and 6). Due to the configuration of the transmission 20, as already described herein, the park release shaft 18 can be biased in the second rotatable direction (e.g., clockwise in FIG. 4) that is opposite the first rotatable direction. Accordingly, rotation of the park release shaft 18 with the neutral locking tool 14 in the first rotatable direction is against this urging by the transmission 20 in the second rotatable direction.

With additional reference to FIGS. 5 and 6, the neutral locking tool 14 can be configured to contact a component 30 disposed in an engine compartment 32 of the vehicle 12 (e.g., an engine intake manifold as depicted in the drawings) when the neutral locking tool 14 has rotated the park release shaft 18 in the first rotatable direction. Such contact by the neutral locking tool 14 with the component 30 serves to hold the park release shaft 18 in a rotated position against the biasing in the second rotatable direction. It is to be understood and appreciated by those skilled in the art that the component 30, which is illustrated as an engine intake manifold in FIGS. 5 and 6, is not so limited and can be any component disposed in the engine compartment 32 against which the neutral locking tool 14 can rest to hold the park release shaft 18 in a rotated position against the rotatable urging of the park release shaft 18 in the second rotatable direction.

The neutral locking tool 14 of the illustrated embodiment includes a handle portion 34 extending from the main shaft 16 at a location spaced apart from the lower end 16a (e.g., at an upper end 16b of the main shaft 16) for rotating the main shaft 16 and the park release shaft 18 when the lower end 16a is coupled to the park release shaft 18. In particular, the handle portion 34 of the illustrated embodiment is fixedly secured to the main shaft 16 at the upper end 16b thereof and can provide rotational leverage for rotating the main shaft 16 and thereby the park release shaft 18 of the transmission 20 against the urging provided by the transmission 20. As shown, the handle portion 34 can extend in approximate perpendicular relation relative to an elongated extent of the main shaft 16. This can facilitate rotation of the neutral locking tool 14 when coupled to the park release shaft 18.

The neutral locking tool 14 of the illustrated embodiment further includes a locking pin 36 slidably disposed on the handle portion 34 at a location spaced apart from the main shaft 16 in generally parallel relation to the main shaft 16. In particular, the locking pin 36 can be slidably received by the handle portion 34, and more specifically through an aperture 38 defined by the handle portion 34. Thus, as shown, the locking pin 36 is slidably disposed along an axis that is parallel to a longitudinal extent of the main shaft 16. The locking pin 36 is moveable to a first sliding position (shown in FIG. 5) to allow rotation of the neutral locking tool 14 within the engine compartment 32 of the vehicle 12 and a second sliding position (shown in FIGS. 1, 2 and 6) wherein the locking pin 36 is positioned against the component 30 within the engine compartment 32 such that the neutral locking tool 14 is prevented from rotating in the second rotatable direction opposite the first rotatable direction until the locking pin 36 is moved back toward or to the first sliding position.

Accordingly, the main shaft 16 of the neutral locking tool 14 extends along this vertical axis of the park release shaft 18 when coupled to the park release shaft 18. The locking pin 36 is received through the aperture 38 in the handle portion 34 so as to be slidable along a second vertical axis that is offset laterally relative to the axis of the park release shaft 18. As shown, the locking pin 36 can include an enlarged head 40 at an upper end thereof and a rubber cover 42 disposed at a lower end thereof. The enlarged head 40 prevents axial movement of the locking pin 36 beyond the aperture 38. The rubber cover 42 prevents damage within the engine compartment 32, such as, for example, to the component 30 (which has been illustrated as an engine intake manifold). Optionally, the locking pin 36 can include a stopper 44 configured as radial protuberance adjacent an upper end of the rubber cover 42. Thus, the stopper 44 of the illustrated embodiment is disposed along the locking pin 36 between and spaced apart from upper and lower ends of the locking pin. The stopper 44 can function to prevent axial movement of the locking pin 36 relative to the handle portion 34 beyond the position of the stopper 44.

In the illustrated embodiment, and with particular reference to FIG. 4, the park release shaft 18 is a stub shaft that protrudes only slightly from the transmission case 22, and particularly from the protuberance 26 of the transmission case 22. The park release shaft 18 can be disposed such that its upper end is vertically spaced apart from an upper end of the engine compartment 32. The park release shaft 18 of the illustrated embodiment has a keyed configuration that can be cooperatively engaged by the lower end 16a of the main shaft 16 for rotation of the park release shaft 18. In particular, the park release shaft 18 can have a keyed portion 18a that cooperatively fits in a slot 46 defined into the lower end 16a of the main shaft 16. While in the illustrated embodiment, the slot 46 is shown centrally located on the main shaft 16 at the lower end 16*a* and likewise the keyed portion 18*a* is centrally provided on the park release shaft 18, it is to be understood and appreciated by those skilled in the art that other arrangements could be employed (e.g., the keyed portion 18*a* and the slot 46 could be eccentrically located).

To facilitate receipt of the keyed portion 18*a* within the slot 46 of the main shaft 16, the main shaft 16 can include a guide sleeve 48 disposed at the lower end 16*a* thereof that is configured to fit onto the park release shaft 18 extending upwardly from the transmission case 22. In particular, an inner diameter of the guide sleeve 48 can match or be only slightly larger than an outer diameter of the park release shaft 18, particularly at a location immediately below the keyed portion 18*a*.

Figure 7:
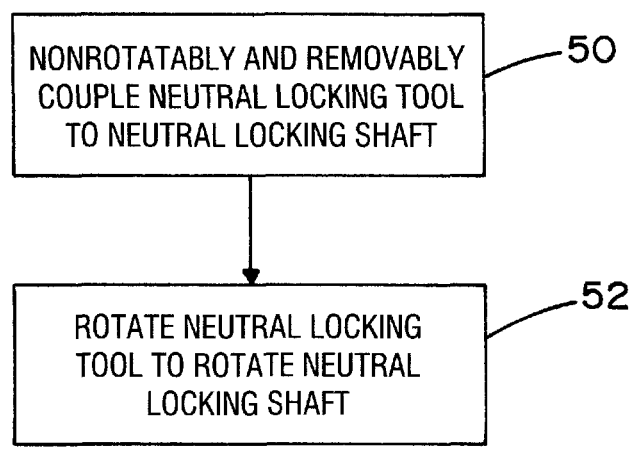
FIG. 7 is a process flow diagram illustrating a neutral locking method for a transmission of a vehicle.

With reference now to FIGS. 5-7, a neutral locking method for a vehicle will be described. In particular, the method will be described in association with the neutral locking system 10 described hereinabove, though it is to be appreciated that the method could be used with other neutral locking systems. In the method, as shown in FIG. 7, the lower end 16*a* of the main shaft 16 of the neutral locking tool 14 is nonrotatably and removably coupled to the park release shaft at 50. As mentioned in association with the neutral locking system 10, the main shaft 16 is elongated for coupling to the park release shaft 18. Nonrotatably and removably coupling the lower end 16*a* of the main shaft 16 to the park release shaft 18 can include inserting the main shaft 16 into a confined area within the engine compartment 32 of the vehicle. For example, the main shaft 16 can be inserted deep into the engine compartment 32 to reach the park release shaft 18. Nonrotatably and removably coupling the lower end 16*a* of the main shaft 16 can also include receiving the keyed portion 18*a* of the park release shaft 18 within the slot 46 defined within the lower end 16*a* of the main shaft 16. Such coupling can further include receiving the park release shaft 18 within the guide sleeve 48 disposed at the lower end 16*a* of the main shaft 16.

Next, as shown at 52 in FIG. 7, the main shaft 16 of the neutral locking tool 14 can be rotated to thereby rotate the park release shaft 18 in the first rotatable direction to place the transmission 20 to the neutral state. Thus, the nonrotatable coupling between the main shaft 16 and the park release shaft 18 allows for rotation of the main shaft 16 to be translated into rotation of the park release shaft 18. As already mentioned, rotation of the main shaft 16 to rotate the park release shaft 18, such as in 52, can include rotating the park release shaft 18 against an urging of the park release shaft 18 in a second rotatable direction that is opposite the first rotatable direction.

In particular and with reference to FIG. 5, rotating the main shaft 16 can include raising the locking pin 36 that is slidably disposed on the handle portion 34 of the neutral locking tool 14, the handle portion 34 being perpendicularly disposed on the main shaft at a location spaced apart from the lower end 16*a*. After rotation of the park release shaft 18 so that the transmission 20 is in the neutral position, the park release shaft 18 can be locked in the rotatable position to maintain the transmission 20 in the neutral state. More particularly, and with additional reference to FIG. 6, locking the park release shaft can include lowering the locking pin 36 and releasing the neutral locking tool such that the locking pin 36 abuts a fixed component (e.g., component 30) disposed in the engine compartment 32 of the vehicle. Once locked in the neutral state, various service operations can be performed on the vehicle 12, as is known and understood by those skilled in the art. The removable coupling between the main shaft 16 and the park release shaft allows for easy decoupling of the main shaft 16 from the park release shaft 18 when desired.

Figure 10:
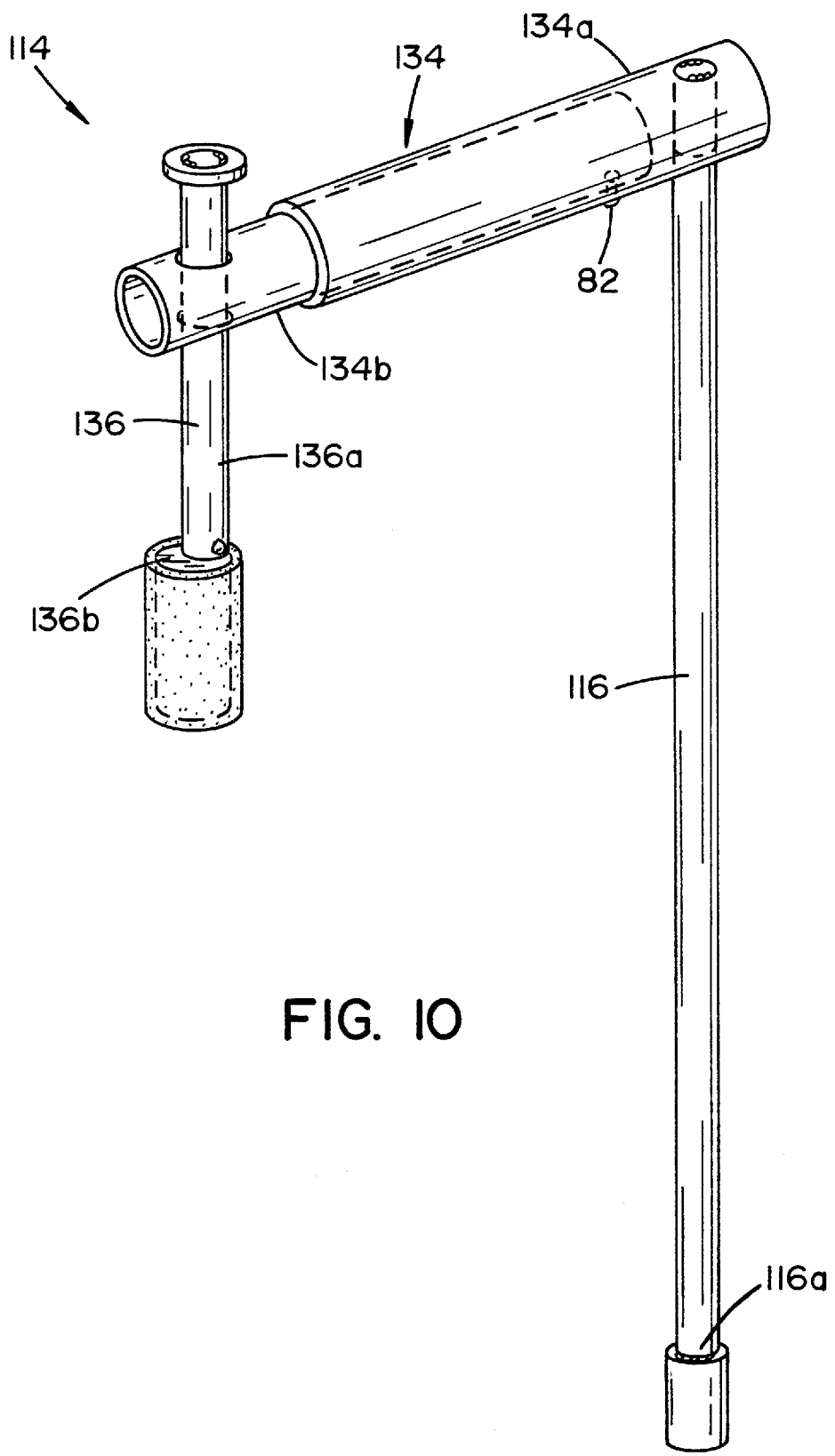
FIG. 10 is a perspective view of a neutral locking tool according to an alternative exemplary embodiment.
Figure 11:
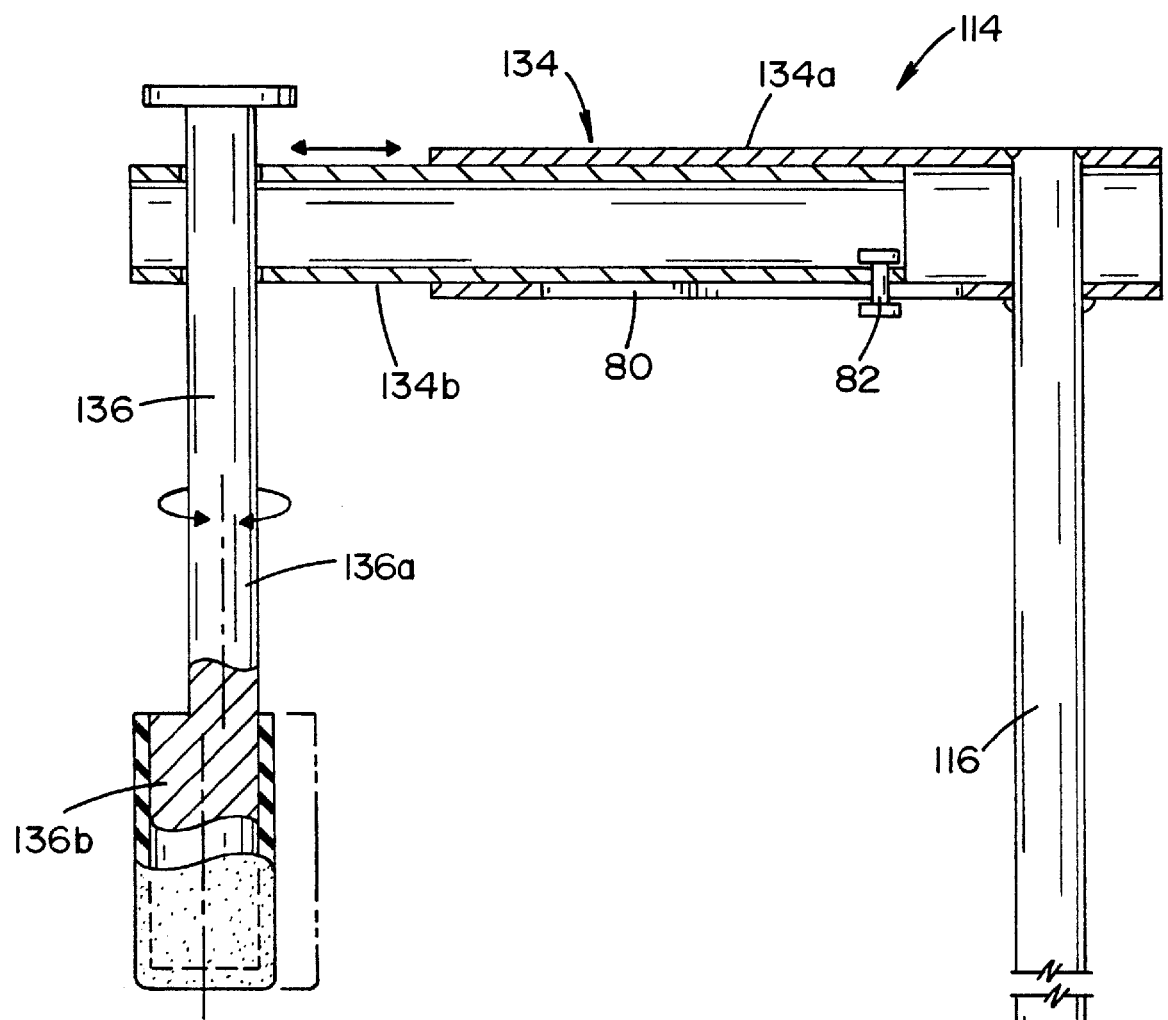
FIG. 11 is a side elevation view, partially in cross-section, of the neutral locking tool of FIG. 10.

With reference now to FIGS. 10 and 11, a neutral locking tool 114 will be described in accordance with an alternative exemplary embodiment. Except as indicated herein, the neutral locking tool 114 can be the same or similar to the neutral locking tool 14. Accordingly, the neutral locking tool 114 can include a main shaft 116 having a lower end 116*a* configured to nonrotatably and removably couple to an associated park release shaft of a vehicle (e.g., park release shaft 18 of vehicle 12) for placing a transmission of the vehicle in a neutral position when rotated. The neutral locking tool 114 can further include a handle portion 134 extending from the main shaft 116 at a location spaced apart from the lower end 116*a* of the main shaft 116 for facilitating rotation of the main shaft 116. Still further, the neutral locking tool 114 can include a locking pin 136 slidably mounted to the handle portion 134 at a location spaced apart from the main shaft 116 for movement between a raised position and a lowered position. When in use, such as within a vehicle's engine compartment, the locking pin 136 in the raised position can allow rotation of the handle portion 134 and thereby the main shaft 116, whereas the locking pin 136 in the lowered position can prevent rotation of the handle portion 114 and thereby prevent rotation of the main shaft 116.

As shown, the handle portion 134 can be a telescoping handle portion having a first member 134*a* attached or secured to the main shaft 116 and a second member 134*b* slidably secured or telescopingly connected to the first member 134*a* for telescoping movement thereto (i.e., to enable telescoping movement of the second member 134*b* relative to the first member 134*a*). In the illustrated embodiment, the first member 134*a* has a sleeve-type configuration and the second member 134*b* is slidably received within the first member 134*a*. Telescoping movement enables the handle portion 134 to be adjustable to different lengths. In this embodiment, one of the first or second members 134*a*, 134*b* of the handle portion 134 can define a slot and the other of the first and second members 134*a*, 134*b* can include a pin that is slidably received in the slot to prevent relative rotation between the first and second members 134*a*, 134*b* of the handle portion and to limit the telescoping movement of the second member 134*b* relative to the first member 134*a*. In the illustrated embodiment, the first member 134*a* has a slot 80 defined therein that extends longitudinally along an axis of the first member 134*a* and the second member 134*b* has a pin 82 affixed thereto that is received in the slot 80. Cooperation between the slot 80 and the pin 82 functions to prevent relative rotation between the first and second members 134*a*, 134*b* and also functions to limit sliding movement of the second member 134*b*.

In addition to sliding movement of the locking pin 136 relative to the handle portion 134, the locking pin 136 is also rotatable about its axis as shown in FIG. 11. Thus the locking pin 136 is rotatably mounted to the handle portion 134 so as to be rotatable about its axis (which can be referred to as a second vertical axis that is spaced apart and parallel to a first vertical axis defined by the main shaft 116). As shown, the locking pin 136 can have an elongated portion 136*a* and a lower portion 136*b* or end. In the embodiment illustrated in FIGS. 10 and 11, the lower portion 136*b* of the locking pin 136 can have an enlarged diameter, particularly relative to the elongated portion 136*a* of the locking pin 136, and can further have an eccentric cam shape relative to the elongated portion 136*a* for enabling precise rotation of the main shaft 116 simply by rotating the locking pin 136. In particular, this can permit minor rotatable adjustments of a park release shaft with the neutral locking tool 114 via rotation of the locking pin 136. Any spring tension from the park release shaft could function to inhibit rotation of the locking pin 136 once set in position against a component within a vehicle's engine compartment.

It is to be appreciated by those skilled in the art that any of the features associated with the neutral locking tool 114 can be applied to the neutral locking tool 14 and vice versa. Additionally, it is to be appreciated that the features of either of the tools 14 and 114 can be mixed and matched in a neutral locking tool as desired. Further, it will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A neutral locking system for a vehicle, comprising:
   a park release shaft operatively connected to a transmission of the vehicle such that rotation of the park release shaft in a first rotatable direction places the transmission in a neutral state, the park release shaft located adjacent an aperture of a transmission case housing the transmission; and
   a neutral locking tool including:
      a main shaft with one end configured to nonrotatably and removably couple to the park release shaft such that rotation of the main shaft rotates the park release shaft;
      a handle portion extending from the main shaft at a location spaced apart from the one end of the main shaft, the handle portion extending in approximate perpendicular relation relative to an elongated extent of the main shaft for facilitating rotation of the neutral locking tool when coupled to the park release shaft, and
      a locking pin slidably received by the handle portion at a location spaced apart from the main shaft, the locking pin movable to a first position to allow rotation of the neutral locking tool within an engine compartment of the vehicle and a second position wherein the locking pin is positioned against a component within the engine compartment such that neutral locking tool is prevented from rotating in a second rotatable direction opposite the first rotatable direction until the locking pin is moved back toward the first position, wherein the locking pin has an elongated portion defining a second vertical axis and a lower portion, the locking pin rotatably mounted to the handle portion so as to be rotatable about the second vertical axis, the lower portion of the locking pin having an enlarged diameter relative to the elongated portion of the locking pin and further having an eccentric cam shape relative to the elongated portion of the locking in for enabling precise rotation of the main shaft by rotating the locking pin.

2. The neutral locking system of claim 1 wherein the park release shaft is biased in the second rotatable direction that is opposite the first rotatable direction, and wherein rotation of the park release shaft with the neutral locking tool in the first rotatable direction is against said biasing in the second rotatable direction.

3. The neutral locking system of claim 2 wherein the neutral locking tool is configured to contact the component disposed in the engine compartment of the vehicle when the neutral locking tool has rotated the park release shaft in the first rotatable direction, the contact between the neutral locking tool and the component holding the park release shaft in a rotated position against the biasing in the second rotatable direction.

4. The neutral locking system of claim 1 wherein the handle portion is a telescoping handle portion having a first member attached to the main shaft and a second member slidably secured to the first member for telescoping movement relative thereto.

5. The neutral locking system of claim 1 wherein the locking pin includes an enlarged head at an upper end and a resilient cover disposed at a lower end.

6. The neutral locking system of claim 5 wherein the locking pin includes a stopper disposed therealong between and spaced apart from the enlarged head at the upper end and from the resilient cover disposed at the lower end of the locking pin.

7. The neutral locking system of claim 1 wherein the locking pin includes a stopper disposed therealong between and spaced apart from an upper end and a lower end of the locking pin.

8. The neutral locking system of claim 1 wherein the park release shaft is a stub shaft that protrudes only slightly from the transmission case and is disposed vertically spaced apart from an upper end of the engine compartment.

9. The neutral locking system of claim 1 wherein the main shaft includes a guide sleeve at lower end thereof that is configured to fit onto the park release shaft extending upwardly from the transmission casing.

10. The neutral locking system of claim 1 wherein the neutral locking tool includes an elongated slot adjacent a lower end of the main shaft and the park release shaft includes a flat keyed portion configured for cooperative engagement with the slot.

11. A neutral locking tool for a vehicle, comprising:
    a main shaft having a lower end configured to nonrotatably and removably couple to an associated park release system of a vehicle for placing a transmission of the vehicle in a neutral position when rotated;
    a handle portion extending from the main shaft at a location spaced apart from the lower end of the main shaft for facilitating rotation of the main shaft; and
    a locking pin slidably mounted to the handle portion at a location spaced apart from the main shaft for movement between a raised position and a lowered position, the locking pin in the raised position allowing rotation of the handle portion and thereby the main shaft, the locking pin in the lowered position preventing rotation of the handle portion and thereby preventing rotation of the main shaft, wherein the locking pin has an elongated portion defining a second vertical axis and a lower portion, the locking in rotatably mounted to the handle portion so as to be rotatable about the second vertical axis, the lower portion of the locking pin having an enlarged diameter relative to the elongated portion of the locking pin and further having an eccentric cam shape relative to the elongated portion of the locking pin whereby the eccentric cam shape has a central axis offset relative to an axis of the elongated portion for enabling precise rotation of the main shaft by rotating the locking pin.

12. The neutral locking tool of claim 11 wherein the handle portion includes a first member secured to the main shaft and a second member telescopingly connected to the first member to enable telescoping movement of the second member relative to the first member.

13. The neutral locking tool of claim 12 wherein one of the first and second members of the handle portion defines a slot and the other of the first and second members of the handle portion includes a pin that is slidably received in the slot to prevent relative rotation between the first and second members of the handle portion and to limit the telescoping movement of the second member relative to the first member.

14. The neutral locking tool of claim 11 wherein the locking pin includes:
- an enlarged head at an upper end;
- a resilient cover disposed at a lower end; and
- a stopper disposed between and spaced apart from an upper end and a lower end of the locking pin, and spaced apart from the enlarged head and the resilient cover.

* * * * *